(12) United States Patent
Scott

(10) Patent No.: US 6,246,025 B1
(45) Date of Patent: Jun. 12, 2001

(54) INSULATED SLAG COLLECTION BED FOR A LASER-EQUIPPED MACHINE TOOL

(75) Inventor: William B. Scott, Rochelle, IL (US)

(73) Assignee: W. A. Whitney Co., Rockford, IL (US)

( * ) Notice: Subject to any disclaimer, the term of this patent is extended or adjusted under 35 U.S.C. 154(b) by 0 days.

(21) Appl. No.: 09/302,278

(22) Filed: Apr. 30, 1999

(51) Int. Cl.[7] .......................... B23K 26/14; B23K 26/16; B23K 26/18
(52) U.S. Cl. ............................. 219/121.67; 219/121.68; 219/121.7; 219/121.73; 83/167; 83/170
(58) Field of Search ...................... 219/121.67, 121.68, 219/121.69, 121.7, 121.71, 121.72, 121.73; 83/31, 167, 170, 701

(56) References Cited

U.S. PATENT DOCUMENTS

| | | | |
|---|---|---|---|
| 4,452,115 | * | 6/1984 | Bredow .................................. 83/157 |
| 5,552,675 | * | 9/1996 | Lemelson ......................... 315/111.21 |
| 5,585,015 | | 12/1996 | Hayashi et al. .................. 219/121.67 |
| 5,637,243 | | 6/1997 | Sato et al. ........................ 219/121.67 |
| 5,648,002 | * | 7/1997 | Omote .............................. 219/121.82 |
| 5,780,805 | * | 7/1998 | Duncan, Jr. et al. ............ 219/121.68 |
| 5,977,515 | * | 11/1999 | Uraki et al. ...................... 219/121.84 |
| 5,986,234 | * | 11/1999 | Matthews et al. ............... 219/121.68 |
| 6,025,571 | * | 2/2000 | Walters et al. ................... 219/121.67 |
| 6,031,200 | * | 2/2000 | Whitehouse ..................... 219/121.67 |
| 6,090,330 | * | 7/2000 | Gawa et al. ........................... 264/400 |
| 6,127,648 | * | 10/2000 | Scott ................................ 219/121.67 |
| 6,168,903 | * | 1/2001 | Cassidy et al. ....................... 430/302 |

* cited by examiner

Primary Examiner—Tom Dunn
Assistant Examiner—Colleen Cooke
(74) Attorney, Agent, or Firm—Leydig, Voit & Mayer, Ltd.

(57) ABSTRACT

An insulated slag collection bed for a laser-equipped machine tool. The bed substantially insulates the machine tool base from thermal damage due to the laser beam of the machine tool. Typically the laser beam in a machine tool will have significant energy density in planes below the workpiece, and in some conditions the energy density will be sufficient to damage the machine base. The present invention protects the machine base by providing a slag collection bed which serves as a shield to absorb remnant laser energy which would otherwise strike the machine base. The shield is thermally insulated from the machine base so as to protect the machine base from the temperature rise in the shield resulting from absorbing the remnant laser energy. If, over time the shield is damaged or worn, means are provided for ready replacement of both the shield and the insulation.

21 Claims, 6 Drawing Sheets

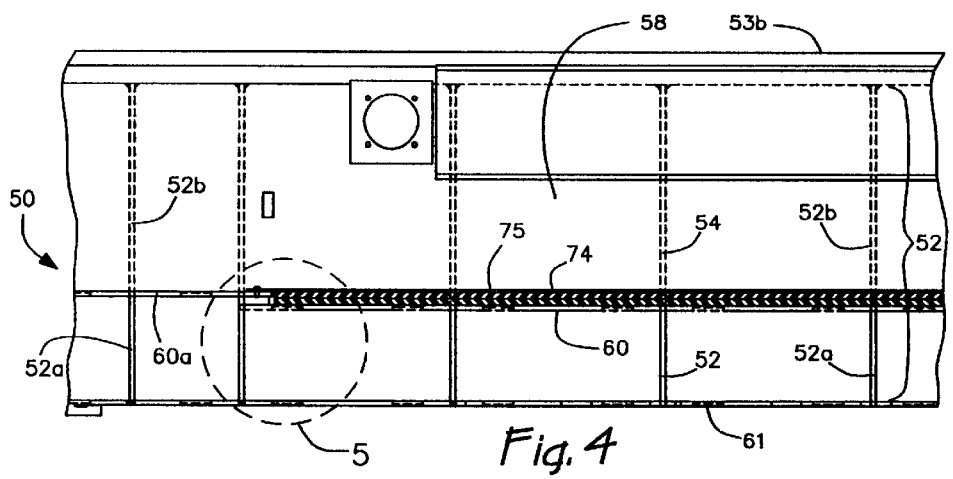
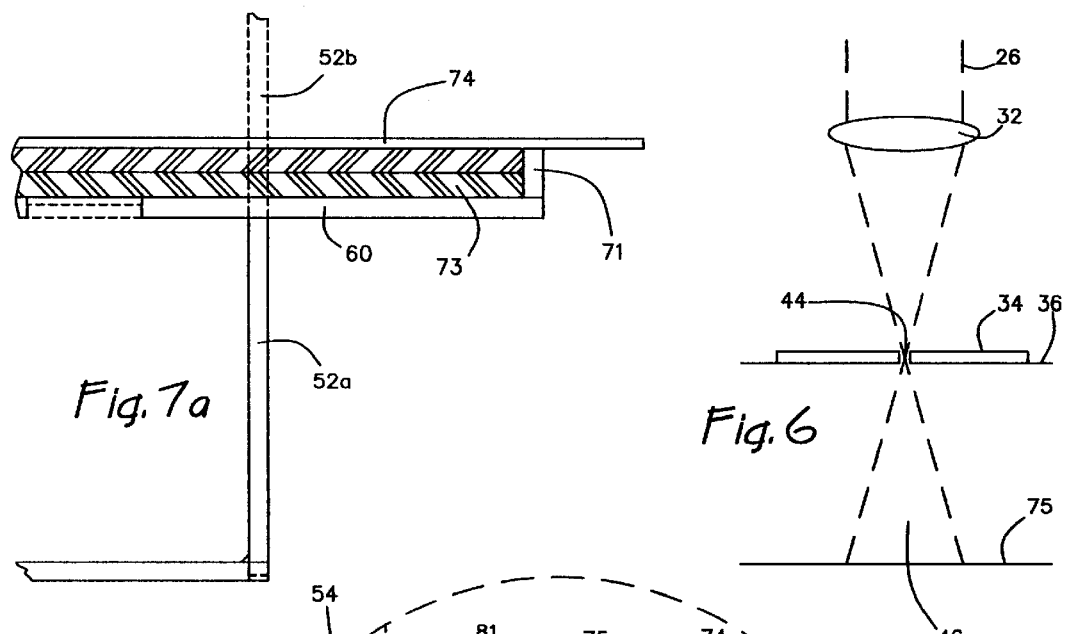
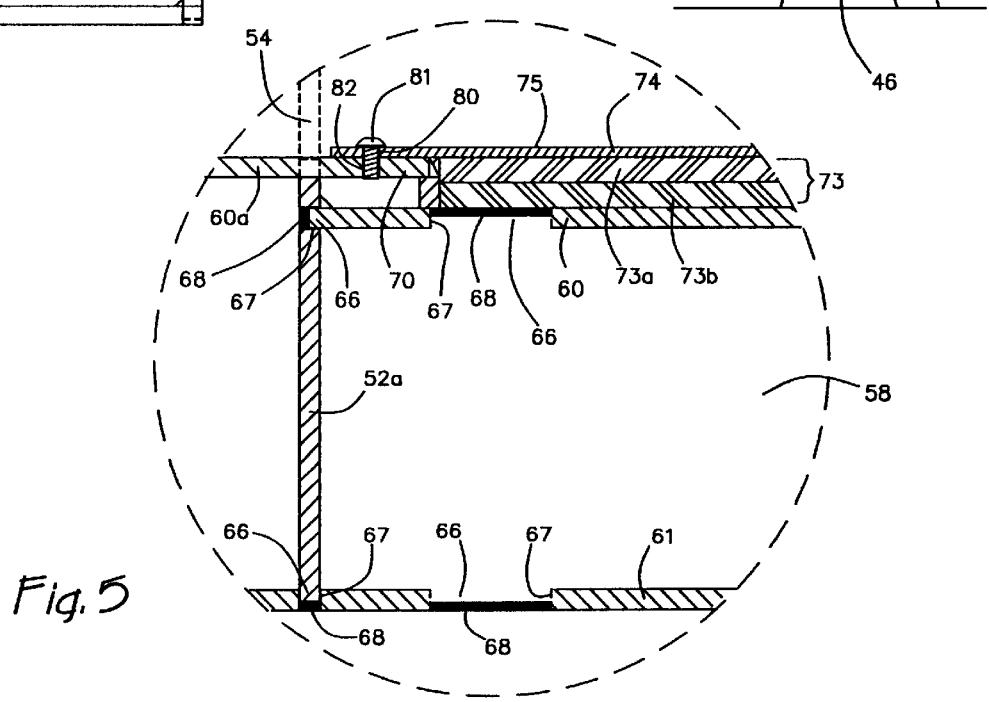

INSULATED SLAG COLLECTION BED FOR A LASER-EQUIPPED MACHINE TOOL

FIELD OF THE INVENTION

The present invention generally relates to machine tools, and more particularly relates to machine tools using lasers for cutting metal and other materials.

BACKGROUND OF THE INVENTION

Laser-equipped machine tools are often used to cut parts from sheet metal and relatively thin plate. In such machine tools a laser beam concentrated by a focusing lens or mirror to a small diameter spot, is directed to position the focal point above, on or below the surface of the material to be cut. The laser beam is directed from the focusing optic through a nozzle disposed immediately above the material workpiece, with a pressurized gas being directed through the nozzle, typically coaxially with the laser beam, to assist making the cut. The pressurized gas interacts with the laser beam and material, facilitating the cutting process, and creates a gas stream which carries the removed material away from the cut.

Laser-equipped machine tools are Computer Numerically Controlled and are manufactured in many configurations and sizes and with lasers of various types and power. In one configuration, "flying optics", the cutting head is adapted for movement along one axis, such as the Y-axis which is mounted on a bridge, and the bridge is adapted for movement in an orthogonal, X-axis. The work is supported on a stationary pallet or table below the bridge. Movement of the cutting head is coordinated with movement of the bridge to define a precise path on the part. The cutting head and laser are controlled to pierce and cut the workpiece to form holes and shapes in the material, then to cut the part from the material. In this configuration the laser is mounted on the stationary machine base or on a separate floor mounted stand.

When using laser-equipped cutting machine tools it is advantageous to utilize optics with different focal lengths to cut various thicknesses of material. The focal length of the optic contributes to the diameter of the focal spot and thus the energy density, Watts per unit area, at the focal spot. Shorter focal length optics create smaller focal spots having higher energy densities. The focal length of the optic also contributes to depth of focus of the focal spot with longer focal lengths having greater depth of focus. Shorter focal length optics are advantageous for cutting thinner materials while longer focal length optics are advantageous for cutting thicker material. Primarily the focal length of the optics and the power level of the laser contribute to the energy density remaining in the laser beam at distances beyond the workpiece.

Many same or different parts of common thickness and material type may be cut from a sheet or plate. Such groups of parts are commonly referred to as a nest. Left over material, after the parts have been removed, is referred to as a remnant or a skeleton. A small remnant which falls from a hole cut in a part is called a slug. Remains of material from the cut is called slag. Resolidified material clinging to the part is called dross. The mixture of slugs and slag residue from cutting sheet material is generally called scrap.

Various means for collecting and removing scrap from laser cutting machines have been utilized. One version is to allow the scrap to accumulate on the floor or on a platform or bed disposed below the cutting area. When the accumulation is excessive it is shoveled out. This method is advantageously low cost. It also has disadvantages. The machine must be shut down while the scrap is removed, reducing productivity. Debris falling from the shovel, can land on way covers or machine parts, where not wanted, leading to premature failures.

Another version is to provide one or more scrap collecting pans under the cutting area to collect the scrap. This solution is also advantageously low cost. It also has disadvantages. The machine is normally shut down while the scrap is removed, reducing productivity. If an excessive amount of scrap is allowed to accumulate, the pans are very difficult to remove. The scrap pans may be large and hard to handle.

Another version is to provide a conveyor disposed below the cutting area to carry or drag the scrap from the machine. While this arrangement costs more, it also improves machine productivity by eliminating machine shut down for removal of scrap. Conveyor systems, however, can increase the height of the bed by an unacceptable amount, and are also prone to damage.

As lasers, with beam qualities suitable for cutting, are developed and become available in higher powered versions, machines are developed having ability to cut greater thicknesses of material. Adapting high power lasers to cut thicker materials leads to using focusing lenses with longer focal lengths. Below the focal point, a laser beam expands at approximately the same rate that it was focused. For example, if a 35 mm diameter laser beam is focused by a lens with a 10" focal length, then, 10" below the focal point, unless absorbed by the material cut, the beam would be about 35 mm in diameter again. Twenty inches below the focal point the beam would be about 70 mm in diameter. This remnant diverging beam from high power lasers have considerable capability to cause damage. For example in testing leading to the present invention, a 0.125" thick aluminum plate was scuffed with steel slag, then a 38 mm diameter 5500 Watt beam was directed at the surface. The aluminum was cut through in 40 seconds. Similar tests were made with 0.25" inch thick stainless steel and carbon steel. Both were cut through in well under a minute. These tests indicated that a scrap collection bed underlying the cutting area of a high power laser system, with long focal length optics in use, would be at considerable risk of being damaged by the remnant laser beam.

SUMMARY OF THE INVENTION

In view of the foregoing it is a general aim of the present invention to provide a scrap collection bed suitable for use with a high power laser-equipped machine tool, which has a substantially reduced risk of being damaged by the laser beam.

More specifically, an object of the present invention is to provide a composite bed for a machine tool in which a scrap collection bed with readily replaceable part shields the machine base from laser damage.

It is a further object of the invention to provide a scrap collection bed that, should it be melted by a high power laser beam, has some capability for self healing.

According to a further aspect of the invention, it is an object to provide such a scrap collection bed which, if damaged, can be readily replaced.

It is a feature of the invention that the height of the machine tool is kept desirably low while still adequately protecting the machine base from the laser, which can be a high power laser beam focused by long focal length optics.

It is a further feature of the invention that a thin planar chamber is formed at the top of the machine base over the area accessible to the laser beam during its traverse, and the chamber is filled with insulation material forming a planar supporting surface. A laser shielding plate overlies the planar supporting surface and is attached to the machine base. The laser shielding plate absorbs the remnant laser energy to protect the machine base from direct cutting by the laser, and the insulation layer protects the machine base from high temperatures which can be generated in the laser shield after absorption of significant quantities of remnant energy.

A further feature of the invention is the provision of a reasonably solid planar support of insulation material underlying the laser shield such that if the laser shield is locally melted, the underlying insulation continues to support the sheet until resolification to aid in maintaining planarity.

Other objects and advantages of the invention will become more apparent from the following detailed description when taken in conjunction with the accompanying drawings.

BRIEF DESCRIPTION OF THE DRAWINGS

FIG. 4 is a sectional view taken along the line 4—4 of FIG. 2, and better illustrating the insulated bed structure;

FIG. 5 is an enlarged sectional view of area 5 shown in FIG. 4;

FIG. 6 is a schematic representation of a laser beam passing through a focusing optic; converging to a focal point, and diverging beyond the focal point;

Figure 1:
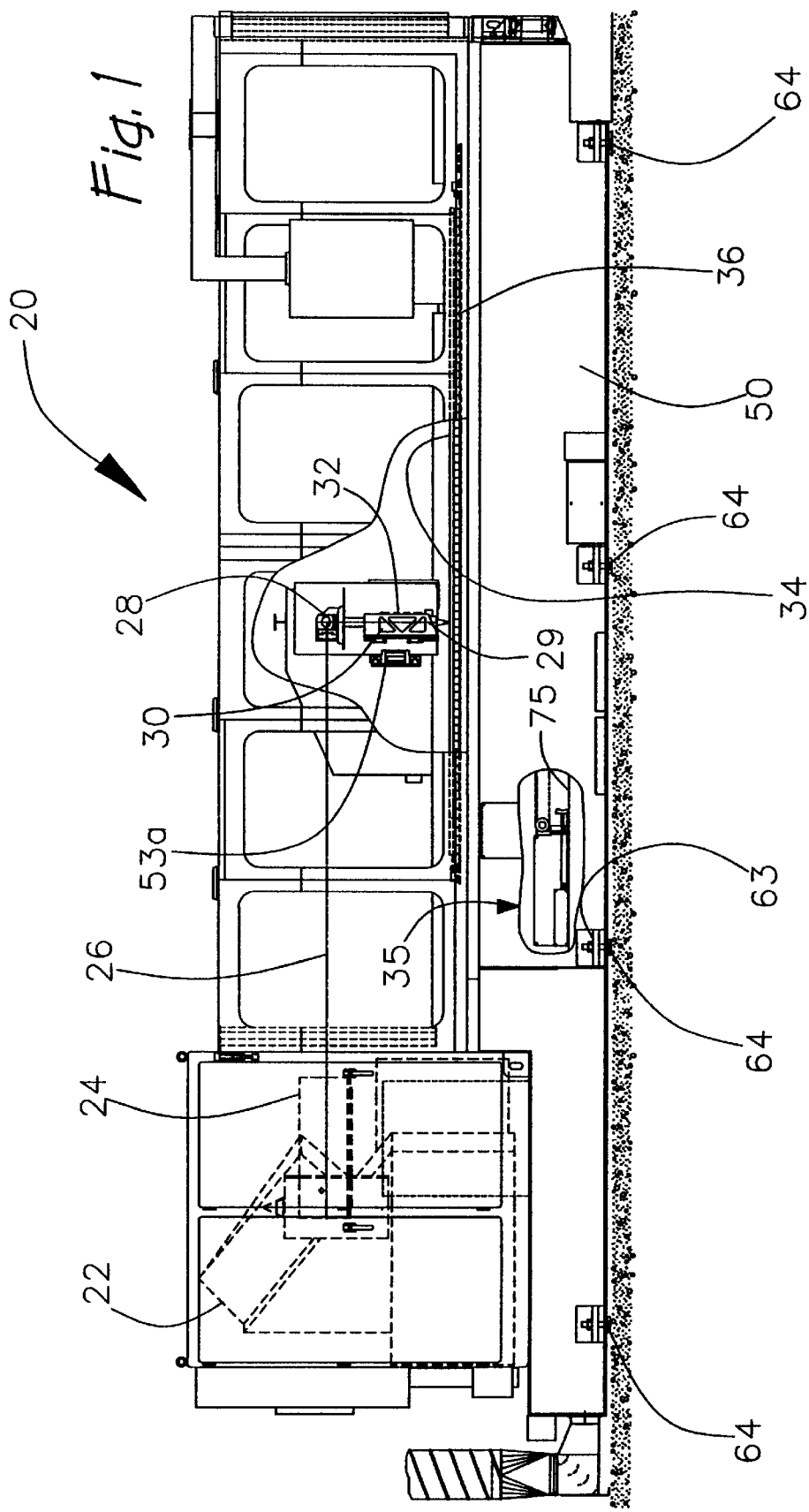
FIG. 1 is a front elevation of a laser-equipped machine tool having a bed structure exemplifying the present invention.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention as defined by the appended claims.

DETAILED DESCRIPTION OF THE PREFERRED EMBODIMENT

Figure 2:
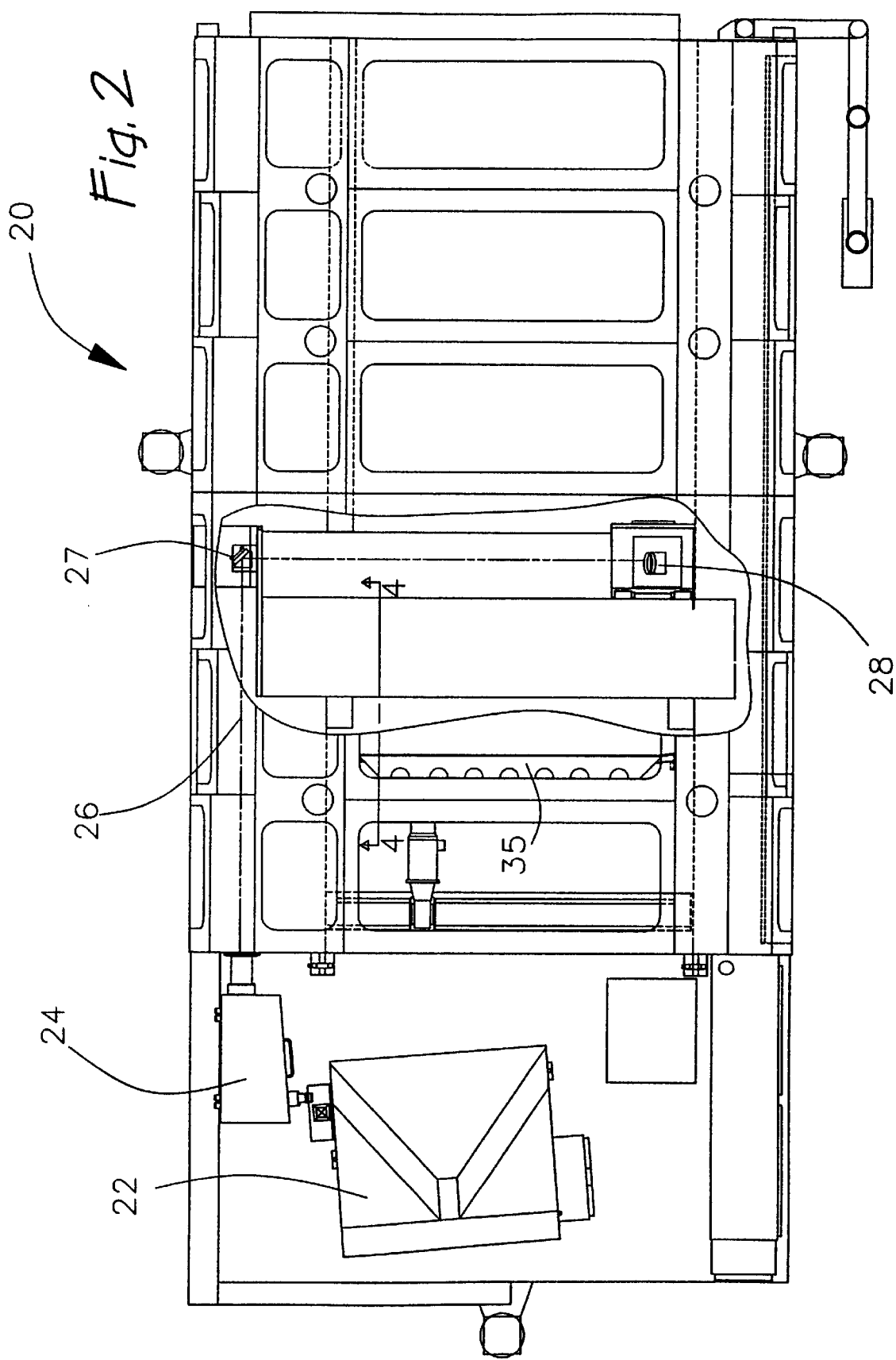
FIG. 2 is a plan view of the machine tool of FIG. 1.

Referring now to the drawings, and with specific reference to FIG. 1, a preferred embodiment of the present invention is generally depicted as embodied in machine tool 20. By way of background machine tool 20 includes a laser source 22 which delivers a high power laser beam to a collimator 24, which in turn directs a collimated laser beam 26 (See FIG. 2) to first bending mirror 27. The laser beam 26 is then directed to a second bending mirror 28 and then to cutting head 30 which includes a focusing optic 32 (See FIG. 6) which focuses the laser beam onto workpiece 34. The laser beam 26 is projected through a nozzle 29 at the base of the cutting head along with a supply of assist gas, such as nitrogen or oxygen. The laser beam and assist gas interact with each other and with the metal to cut through the workpiece 34. While an important use of laser cutting machines is the cutting of metal, it will be noted that other materials can be cut, and the invention is not limited to lasers for cutting metal.

Workpiece 34 in the preferred embodiment, is mounted on table or pallet 36 which is constructed for minimum interference with the laser, and to allow slag and scrap to readily fall through the table. The table 36 is preferably made up of a plurality of bars spanning the width of the table, and turned on edge so that their narrow cross-section is presented to the laser. The upper edge of each bar is serrated in large tooth like fashion to support the workpiece at a plurality of points in bed-of-nails fashion. Such worktables are known in the laser cutting art, and will not be further described, except to note the feature that the scrap material generated during the cut will readily fall through the worktable.

The machine base 50 supports the operative elements discussed thus far, including the table 36 and the cutting head 30, along with additional elements such as the slag collection bed, to be described below, and a slag removal system diagrammatically depicted at 35 in FIG. 1. Those familiar with such machines will appreciate that the base must be strong, rigid and stable in order for a high performance machine as illustrated to perform within its designed close machining tolerances.

Figure 3:
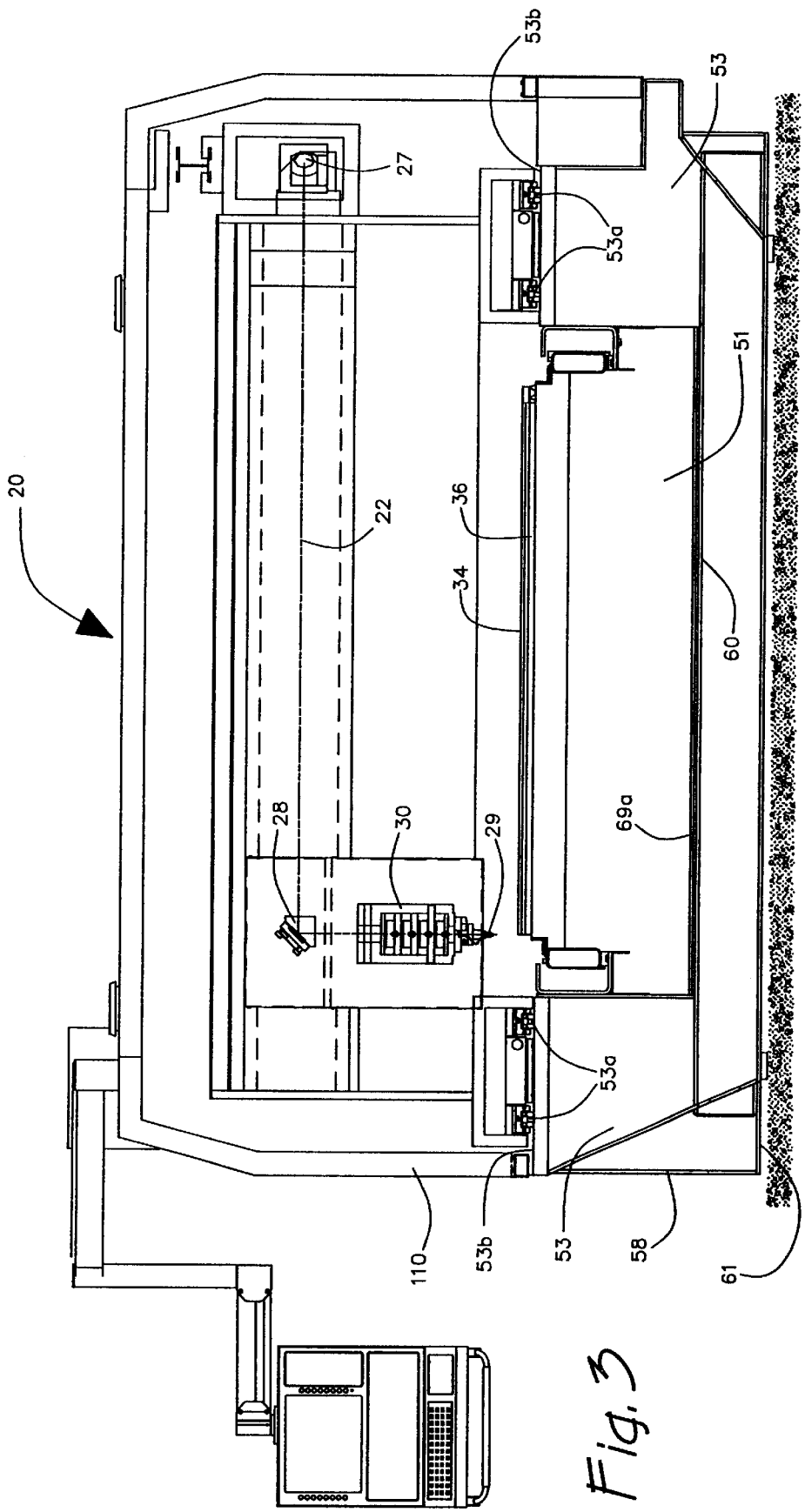
FIG. 3 is an end elevation of the machine tool of FIG. 1.
Figure 7:
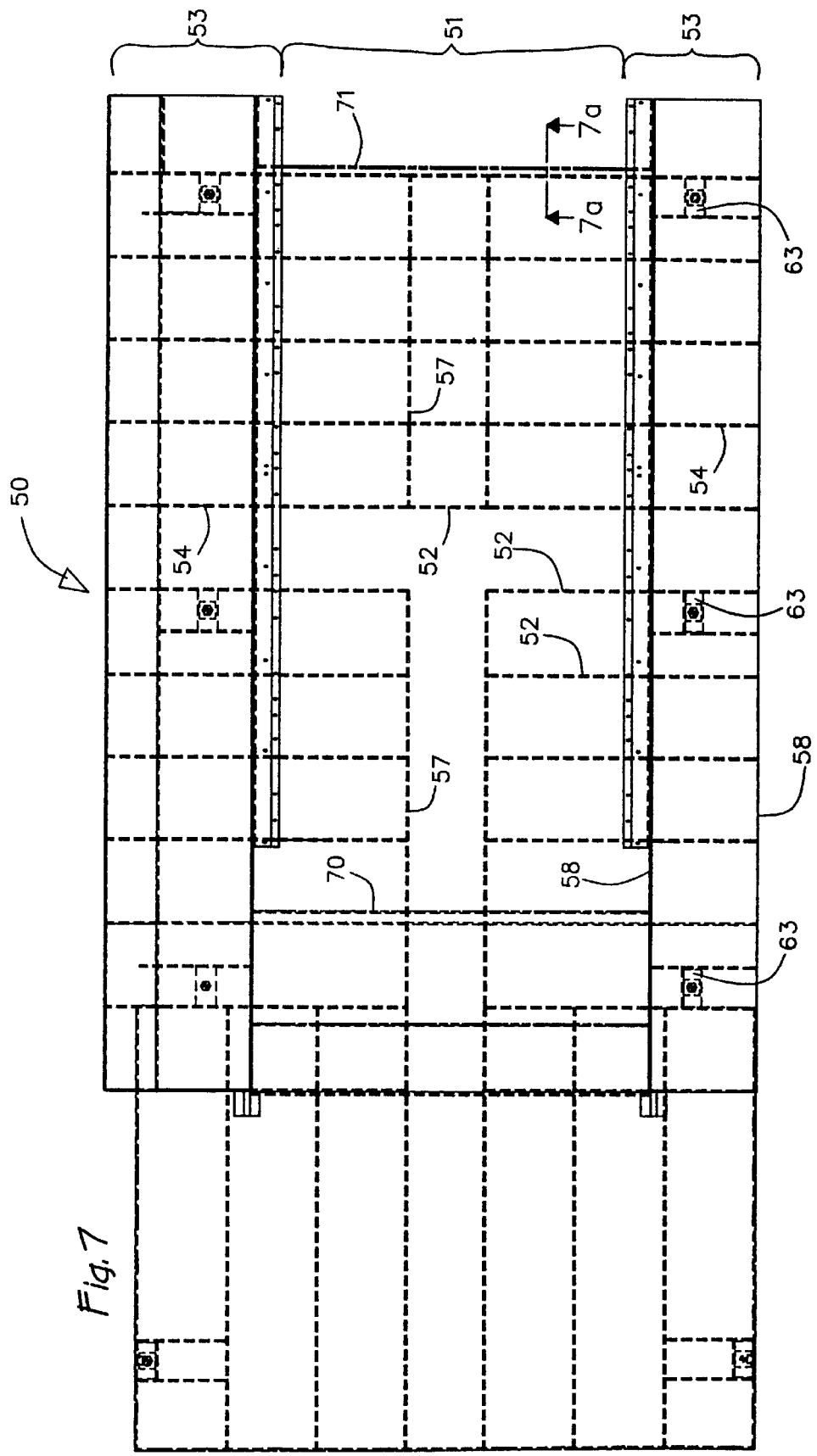
FIG. 7 is a plan view showing the machine base of the machine tool of FIG. 1.
Figure 8:
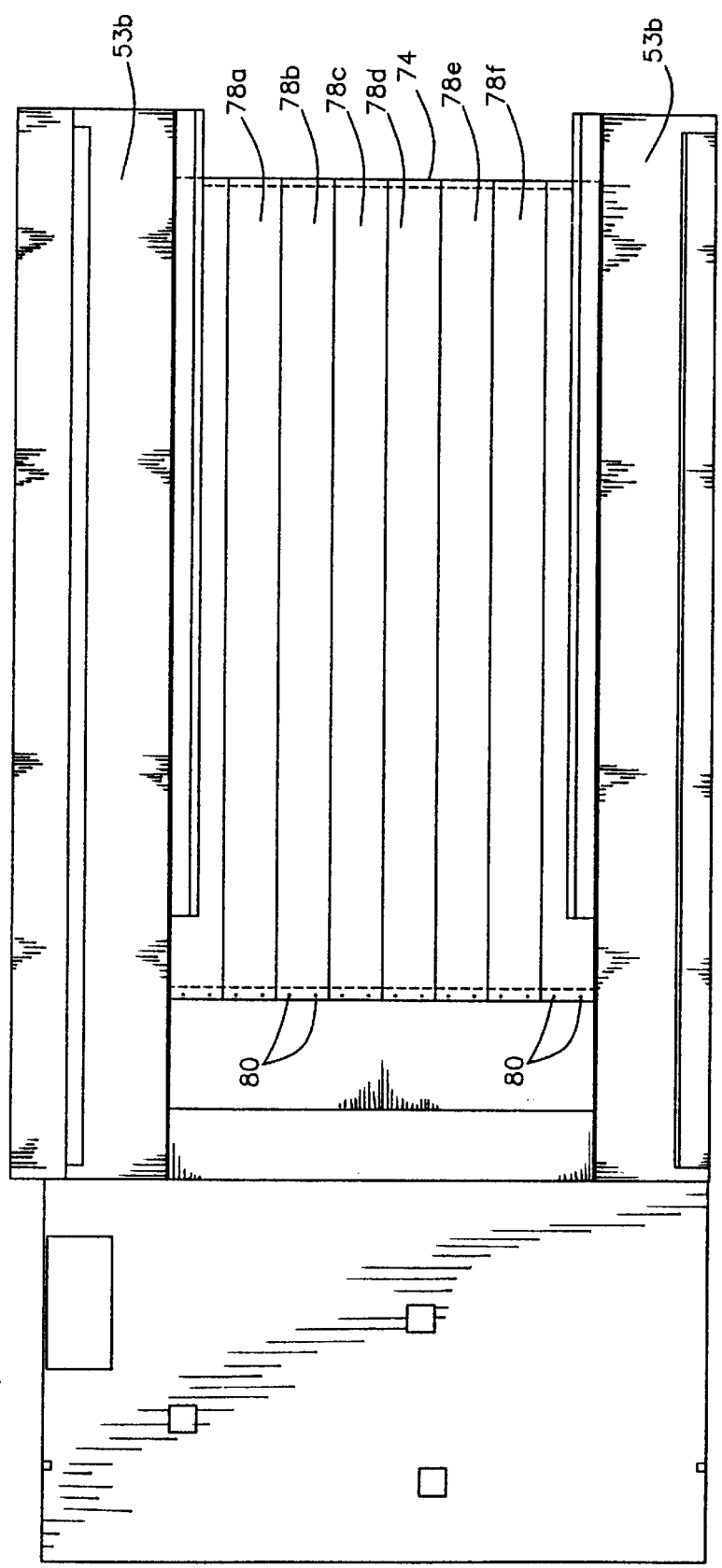
FIG. 8 is a plan view of the laser shielding plates.

In providing for a strong and rigid base, the present invention uses a welded structure comprising elongated box structures, joined by a plurality of rigid cross-members. FIG. 7 shows the base in plan view, FIG. 4 in elevation and FIG. 5 in elevational section. As shown in end elevation in FIG. 3 the base is of U-shaped configuration, with a trough 51 underlying the worktable and cutting area, interposed between a pair of upstanding legs 53 at either side, which provide support, for example, for the ways 53a on which the bridge carrying the cutting head rides.

Thus, referring again to FIGS. 4 and 7, vertical plates 52 run in the lateral direction and are L-shaped with the foot 52a of the L underlying the trough 51, and the ascender 52b of the L underlying the legs. These parts may, for convenience be referred to herein as the short lateral plates 52a and the taller lateral plates 52b. Running longitudinally of the machine and intersecting the lateral plates 52 are longitudinal plates. Short longitudinal plates 57 are about the same height as the short lateral plates 52a and attached to those plates, to form a supporting structure within the trough 53. Taller longitudinally directed plates 58 are about the same height as the longer lateral plates 52b and define the sides of the legs 53.

FIG. 4 shows the structure in elevation, and also shows top and bottom members for the box structure. More particularly, a top is formed by a longitudinally extending horizontal plate 60, which establishes the level of the slag collection trough. A bottom plate 61 is fixed to the foot of each of the upstanding plates. The legs 53 are closed at their tops by plate 53b. Mounting pads 63 are rigidly affixed to the bottoms of certain of the box structure plates, as illustrated in FIG. 7, in order to provide a supporting structure for leveling feet 64 which engage the pads 63 and are adjusted for leveling of the machine. The base structure is a welded tab and slot construction, better illustrated in FIG. 5. Thus, the vertical longitudinal plates 57, 58, the vertical lateral plates 52, 54 and the horizontal plates 60, 61 have appropriate tabs 66 filling units slots 67 and welded, for example, at 68 to provide the rigidified box structure. This strength and rigidity is provided without the weight penalty of a cast base.

In practicing the invention, the base structure just described is protected from laser damage by a structure which also serves as the facility for collecting slag and scrap generated during the cut.

Referring briefly to FIG. 6, the problem of protecting the machine bed will be emphasized. FIG. 6 diagrammatically shows a laser beam 30 incident on focusing optics 32 in the cutting head which focuses the beam to a focal point 44. The beam then diverges at about the same angle as the convergence angle. Thus, if a 5,000 watt laser beam 35 mm in diameter were incident on a lens having a 10 inch focal length, if no workpiece were interposed so that there was no energy absorber in the beam path, at a position 10 inches below the focal point the remnant beam 46 would again be at 35 mm diameter and would have a power of about the same level (e.g. 5,000 watts) as the incident beam. Even at 20 inches from the focal point the remnant beam would have a 70 mm diameter with significant and potentially dangerous energy density. In a practical laser cutting machine, particularly one configured for high power, it is not convenient or practical to provide a sufficient air space between the nozzle and the slag collector to adequately protect the machine base. If the machine base protection problem were ignored altogether, there is a significant probability that at some time during the life of the machine the laser energy which was projected onto the base over time, including beams partly absorbed by the workpiece, or a direct beam when no workpiece is in place, would cause a failure in the base. When used herein, the term "remnant laser beam", unless context indicates otherwise, it is intended to encompass both beams partly absorbed by the workpiece, and those which project past the workpiece, and the energy contained in such beams.

In accordance with the invention, means are associated directly with the base for performing the functions of insulating the machine base from the possibly high temperatures generated in the slag bed and the slag during the cutting operation, for collecting the slag in a way which allows for ready removal, and for providing a readily replaceable shield for the base which can be damaged during extended machine usage then replaced. The shield member is strong and durable, is insulated from the base itself, is relatively inexpensive, and can be replaced at relatively low cost, particularly as compared to repairing structural damage in the base.

With reference primarily to FIGS. 4 and 5, the preferred form of insulated machine base will be described. One of the horizontal plates 60a terminates in an extended lip 70 which extends across the entire width of the machine. The lip 70 is positioned out of the range traversed by the cutting head, so that it will not be exposed directly to the laser beam. A supporting plate 71 is provided at the far longitudinal end of the machine (see FIGS. 7 and 7a). The plate 71 can, as suggested in FIG. 7a be in the form a bar having a length equal to the width of the bed, and placed on edge as illustrated in to close the bottom of the pocket now to be described. The plates are positioned to provide support surfaces at a known distance above the top surface of the horizontal plate 60. The known distance provides a chamber to receive and hold insulation material as shown in FIGS. 4 and 5. Thus, sheet like insulation material 73 is disposed in the chamber formed between the supports 70, 71 so that it forms a top surface which is co-planar with the supports 70, 71. Overlying the insulation material 73 is a metal plate 74, preferably steel, which has an outer surface 75 serving as the collection surface for the slag and scrap, and a laser shield for the base.

The insulation 73, in addition to performing its insulation function, provides a flat supporting surface for the protective shield 74. There will be times in machine operation where the shield will be heated to the point of sagging or even melting. Providing a firm planar underlying support allows the metal of the shield 74 to resolidify while still retaining its still substantially planar configuration.

For insulation, it is currently preferred to use ordinary gypsum board, preferably two sheets 73a, 73b, totaling about 1.25 inches in thickness. The gypsum board 73a, 73b is inexpensive, and can be readily obtained and easily cut to size. It is easy to dispose of when it needs to be changed. It provides a flat planar surface for supporting the protective plate 74 and can withstand the temperatures if the plate melts, while continuing to support the plate during the resolification interval. It is preferred to use two sheets of gypsum board so that the gap therebetween provides a further barrier to heat transfer.

The protective plate 74 is preferably comprised of a plurality of individual side by side strips 78a, 78b, etc. The strips span from the left hand supporting lip 70 to the right hand supporting lip 71 and are supported by the gypsum board between the lips. In this illustrated embodiment, each strip has a pair of apertures 80 through which fasteners 81, such as a conventional machine bolts, project to fit into threaded holes 82 in the forward lip 70 to thereby fix the strip in place. Attachment need not be made at the other end (at the strip 71), to allow freedom for the strip to expand and contract. Other attachment or drop-in arrangements can be used. If one or more strips are damaged during the course of long use of the laser cutting tool, or during an accident, it is a relatively simple matter to remove the fasteners 81, remove one or more damaged strips, and replace them with equivalent strips, whereupon the machine is again ready for operation. It is not necessary to replace the entire bed at once, but only a single strip whenever it is required. Similarly, if the insulation material is damaged at some point, a number of strips can be removed for replacing entire sheets of gypsum board or sections thereof can be cut out and replaced with sections of equal size.

With respect to the materials of construction of the insulated bed, the aforementioned double sheet gypsum is the currently preferred embodiment, but it will be clear to those skilled in the art, that other forms of insulation can be used. Gypsum board is however useful in the present application because it is low in cost, rugged, and has a very low thermal conductivity factor, approximately 0.062. Any equivalent material should have a conductivity factor at about the same or lower value, preferably at least 0.1 or lower. Tests utilizing gypsum board have determined that even though the laser can produce temperatures in excess of 2500° F. at the surface 75 of the shield 74, the temperature between the gypsum board layers 73a, 73b can be maintained at less than 600° F., and that the temperature at the bottom surface of the bottom layer 73b can be maintained at less than 150° F., well below the point at which the machine base will experience any thermal damage.

It was also noted above that strips 74 are preferably steel. This is due in part to the fact that steel has been found adequate to resist the detrimental effects of slag for a time, and is relatively inexpensive and available.

Aluminum, while a good thermal conductor, is not sufficiently hard to withstand the slag removal process. Other alloys might be used and be effective, but typically at a higher cost than steel.

In summary, and referring again to FIG. 1, when a laser-equipped cutting machine is to be operated, a worktable or pallet with mounted workpiece is cycled into the machine. The cutting head 30 is then activated to begin traverse under computer control. The laser is energized and the laser beam, along with a flow of assist gas is projected onto the surface of the workpiece. The laser penetrates the workpiece and begins to cut parts as determined by the CNC control. The laser moves from nest to nest cutting the parts until the operation is complete. The slag and slugs which are generated during the cuts simply fall through the worktable onto the slag collection bed where they are held while they cool somewhat. The energy of the remnant laser beam which projects through the plate and impinges on the surface of collection bed and the slag collected on the bed can create severe local increases in temperatures of shielding plates 78a, 78b, but without damage to the underling bed. When the workpiece cuts are completed, the machine cycles to remove the worktable with the skeleton and cut parts, the slag removal system (see the aforementioned co-pending application) cycles to scrape the slag from the collection trough, a new worktable with a new workpiece is cycled into the machine, and the process repeated. The machine can operate on extended continuous cycles to produce a large number of parts at high efficiency. If due to a malfunction or other occurrence, the slag collection trough is sufficiently damaged that slag cannot be readily removed, for example, it is a relatively simple matter to have one or more of the plates 78a, removed and replaced, whereupon the machine can be returned to service. Even it is necessary to replace the entire slag collection trough, that can be done with a relatively short and straightforward service procedure, without undue expense, and with a fairly short down time for the machine.

What is claimed is:

1. A laser-equipped machine tool comprising in combination:
   a machine base supporting a worktable adapted to hold a workpiece;
   the machine base also supporting a cutting head including a laser focusing assembly mounted for traverse over the worktable and adapted to cut the workpiece, the traverse having length and width limits which define a cutting zone;
   a trough in the machine bed underlying the worktable and having a trough bottom separated from the worktable by a gap;
   a thin planar chamber at the trough bottom and extending over the bottom for at least an area underlying the cutting zone;
   thin sheet like insulation material in the chamber; and
   a removable protective shield overlying the insulation material to serve as a laser shield and a slag collection surface.

2. The combination of claim 1 wherein the removable protective shield comprises a steel plate having sufficient thickness to support slag produced during cutting.

3. The combination of claim 1 wherein the removable protective shield includes a plurality of separately removably attached sections to facilitate partial replacement of the shield.

4. The combination of claim 2 wherein the removable protective shield includes a plurality of separately removable steel strips having sufficient thickness to support slag produced during cutting.

5. The combination of claim 2 wherein the insulation material comprises planar gypsum sheets providing a planar surface supporting the steel plate to maintain planarity of the plate even if melted by the laser.

6. The combination of claim 5 wherein the insulation is provided in first and second replaceable layers of gypsum board.

7. The combination of claim 1 wherein the machine base includes a plurality of longitudinal plates, a plurality of lateral plates, and a plurality of vertical plates welded in a rigid box frame.

8. The combination of claim 1 wherein the insulation has a thermal conductivity factor of less than 0.1.

9. A laser-equipped machine tool insulated slag collection bed, comprising:
   a machine base;
   an insulated layer disposed on the machine base;
   a replaceable bed removably positioned over the insulated layer, the replaceable bed being metallic and adapted to absorb the energy from any remnant laser beam projected through or past the workpiece; and
   the insulated layer being of sufficient thickness to protect the machine base from surface temperature of the replaceable bed ranging to 2500° F.

10. In a laser-equipped machine tool having a machine base supporting a slag collection surface separated by a gap from a worktable, and a laser cutting nozzle projected at the worktable and thence the slag collection surface, the gap being insufficient to protect the machine base from thermal damage caused by the laser beam under at least some operating conditions, the improvement comprising:
    an insulation layer covering the machine base over the area thereof which is susceptible to laser damage;
    a laser shield overlying the insulation layer for absorbing remnant laser energy to protect the machine base therefrom; and
    the insulation layer being of sufficient thickness to protect the machine base from thermal damage from temperature rise in the laser shield caused by absorption of the remnant laser energy.

11. The improvement of claim 10 wherein the insulation layer comprises at least one layer of gypsum board underlying and supporting the laser shield.

12. The improvement of claim 11 wherein the laser shield comprises a plurality of steel strips affixed to the machine base and overlying the gypsum board.

13. In a laser-equipped machine tool of the type having a cutting head focusing a laser beam toward a table adapted to support a workpiece to be cut by the focused laser beam, and a machine base supporting the table and the cutting head, the combination comprising:
    a collection surface provided below the table for collecting slag produced during cutting, the collection surface being attached to the machine base;
    an insulation layer between the machine base and the collection surface; and
    the collection surface comprising a shielding plate removably affixed to the machine base, removal of the shielding plate allowing access to and repair of the insulation layer.

14. The combination of claim 13 wherein the collection surface is positioned sufficiently close to the table so as to be acted upon by the laser beam, the collection surface being removably attached to the machine base to facilitate replacement if damaged by the laser.

15. The combination of claim 14 wherein the collection surface includes a plurality of individual sections to facilitate partial replacement of the collection surface.

16. The combination of claim 14 wherein the collection surface includes a plurality of longitudinal metal plates individually attached to the machine base.

17. The combination of claim 13 wherein the machine base includes a chamber directly below the supporting table, the insulation being disposed within the chamber, the collection bed being attached to the machine base at a position which is not directly below the table.

18. The combination of claim 13 wherein the insulation has a thermal conductivity factor of less than 0.1.

19. The combination of claim 14 wherein the insulation is provided in the form of gypsum sheets underlying the collection surface for maintaining planarity of the shielding plate if locally melted by the laser beam.

20. The combination of claim 19 wherein the collection surface includes a plurality of metal strips individually and removably attached to the machine bed to facilitate partial replacement of the collection surface.

21. In a laser-equipped machine tool having a machine base supporting a slag collection surface separated by a gap from a worktable, and a laser cutting nozzle projected at the worktable and thence the slag collection surface, the gap being insufficient to protect the machine base from thermal damage caused by the laser beam under at least some operating conditions, the improvement comprising:

an insulation layer covering the machine base over the area thereof which is susceptible to laser damage;

a laser shield overlying the insulation layer for absorbing remnant laser energy to protect the machine base therefrom, the laser shield being positioned to function as the slag collection surface;

the gap between the slag collection surface and worktable comprising a chamber dimensioned and positioned to accept the insulation layer; and the insulation layer being of sufficient thickness to protect the machine base from thermal damage from temperature rise in the laser shield caused by absorption of the remnant laser energy.

* * * * *